J. LAMB.
ELECTRIC PROPULSION AND CONTROL FOR MOTOR BOATS.
APPLICATION FILED JAN. 14, 1913.
1,133,977.
Patented Mar. 30, 1915.
3 SHEETS—SHEET 2.
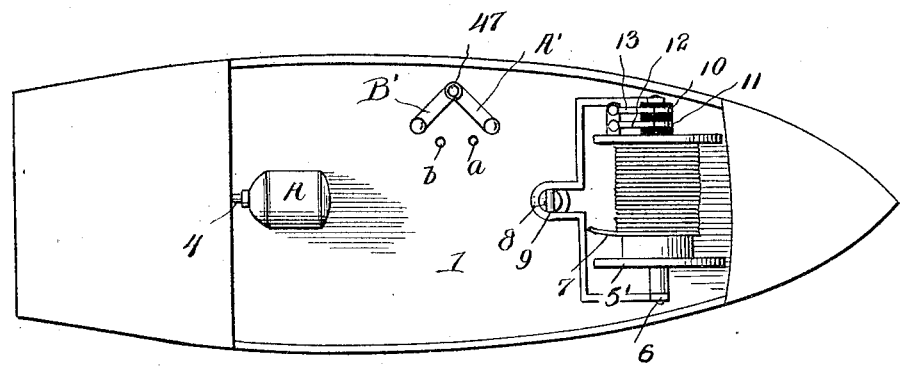
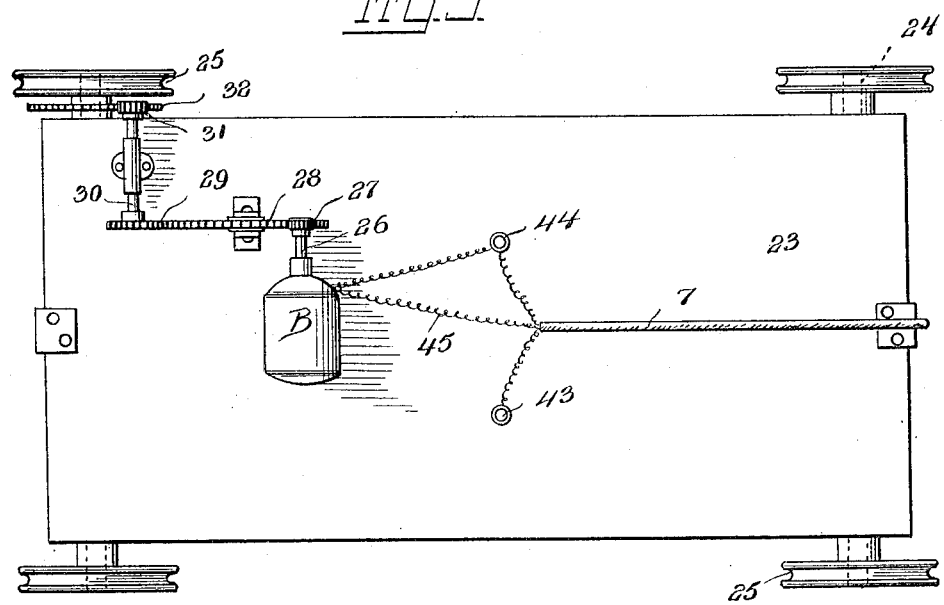
Witnesses
William Smith
R. M. Smith
Inventor
James Lamb.
By Victor J. Evans
Attorney J. LAMB.
ELECTRIC PROPULSION AND CONTROL FOR MOTOR BOATS.
APPLICATION FILED JAN. 14, 1913.
1,133,977.
Patented Mar. 30, 1915.
3 SHEETS—SHEET 3.
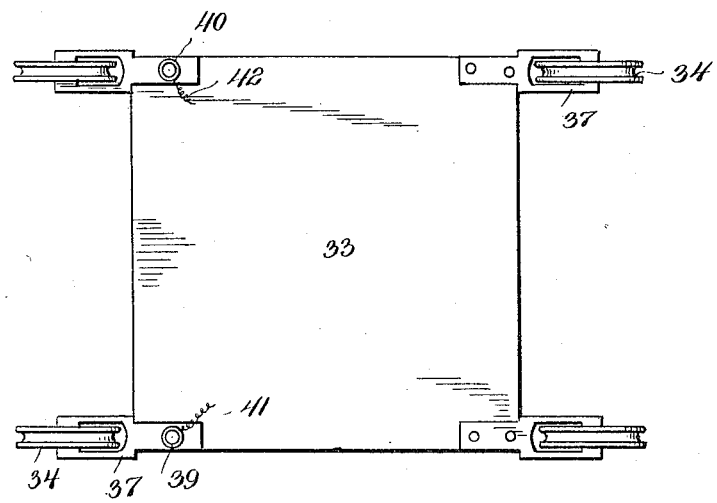
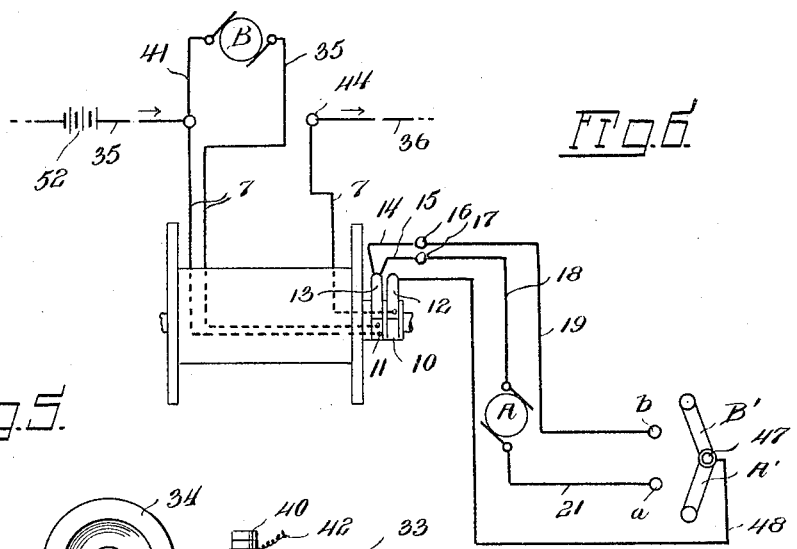
Inventor
James Lamb.
Witnesses
William Smith
R. M. Smith.
By Victor J. Evans
Attorney

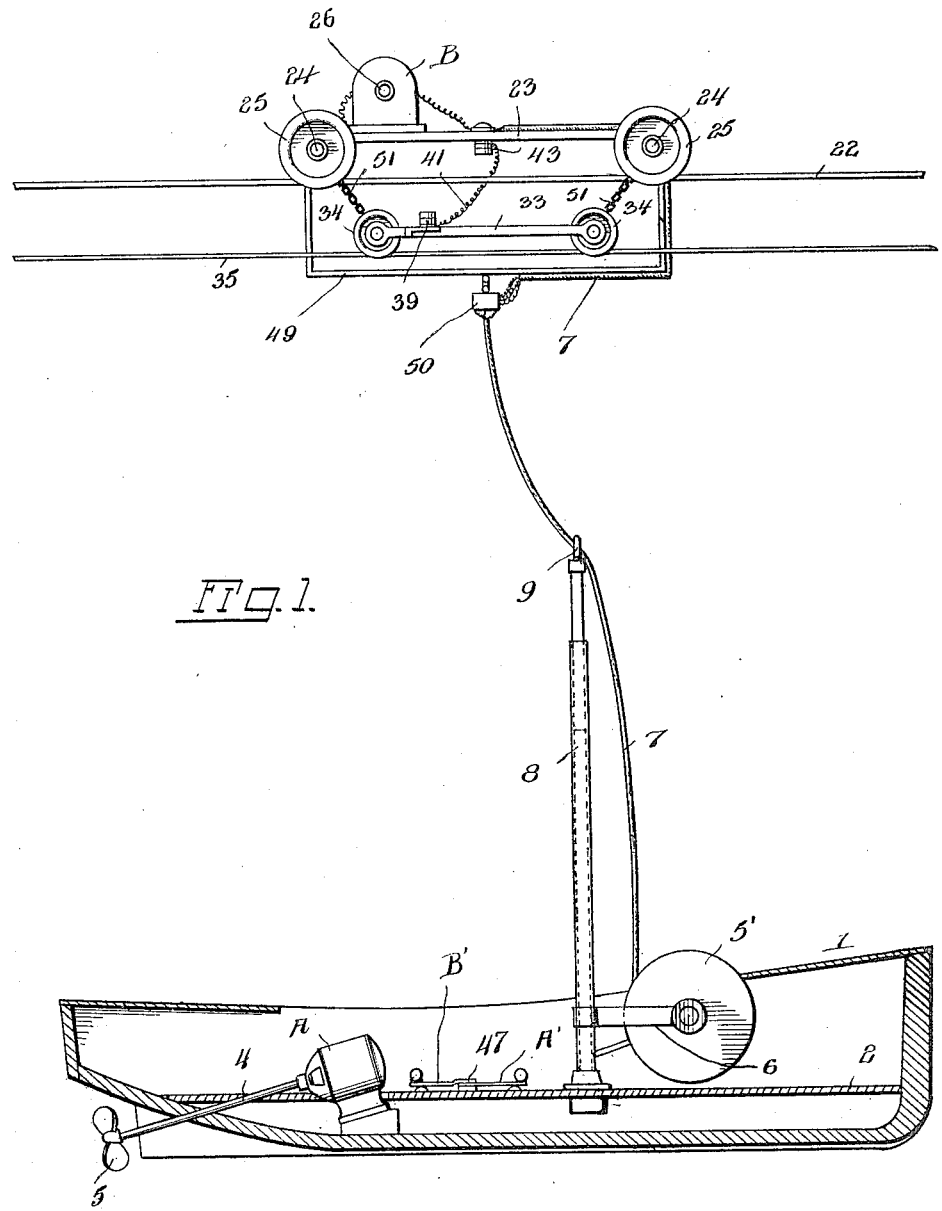

UNITED STATES PATENT OFFICE.

JAMES LAMB, OF CANTON, ILLINOIS.

ELECTRIC PROPULSION AND CONTROL FOR MOTOR-BOATS.

1,133,977.  Specification of Letters Patent.  Patented Mar. 30, 1915.

Application filed January 14, 1913. Serial No. 742,044.

*To all whom it may concern:*

Be it known that I, JAMES LAMB, a citizen of the United States, residing at Canton, in the county of Fulton and State of Illinois, have invented new and useful Improvements in Electric Propulsion and Control for Motor-Boats, of which the following is a specification.

This invention relates to electric propulsion and control for motor boats, the object in view being to provide practical and reliable mechanism, whereby a boat containing an electric motor may be propelled by means of an electric current generated at any suitable point and conveyed to the motor in the boat by overhead current wires, combined with a truck or carriage movable along an overhead track, running in substantially parallel relation to the current wires, and a flexible electrical conductor cable supported by said truck and receiving its current from said wires and furnishing the same to the motor with which the boat is equipped.

A further object of the invention is to provide, in combination with the truck hereinabove referred to, a motor for actuating the truck independently of the motor boat, together with switch controlled circuits within reach of the person in the motor boat, whereby either one of said motors may be cut in or cut out independently of the other, or both motors cut in so as to operate simultaneously. The arrangement referred to avoids the necessity of the motor boat dragging the overhead truck, or the overhead truck dragging the motor boat.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation, partly in section, showing the complete apparatus. Fig. 2 is a plan view of the motor boat, showing the motor, drum and switch therein. Fig. 3 is a top plan view of the truck or carriage. Fig. 4 is a top plan view of the current collector. Fig. 5 is a detail vertical section through a portion of the current collector. Fig. 6 is a diagrammatic view of the circuits, showing the motors, switches and drum included therein.

Referring primarily to Fig. 1 of the drawings, 1 designates a motor boat, shown as provided with a floor 2 therein, and an electric motor A, the shaft 4 of which is equipped with a suitable propeller 5 for driving the boat. A cable winding drum 5' is also journaled on suitable supports 6 extending upwardly from the floor 2 of the boat, 7 designating a three-wire electrical conductor or cable, a portion of which is wound upon said drum, as shown in Fig. 2. The boat is also shown as provided with a mast 8 provided with a guiding eye 9 swiveled on a vertical axis in the top thereof, through which the cable 7 passes, the eye 9 being swiveled to turn so that if it is desired to make the boat follow a circular course, the cable will not become wrapped around the mast 8.

22 designates a pair of parallel track wires arranged at a suitable elevation above the water, and supported at their opposite ends in any convenient way, as by poles or posts on the shore. Mounted to travel on these track wires is a truck, embodying a platform 23 supported by axles 24 having grooved wheels 25, as shown in Figs. 1 and 3. B designates a second electric motor which is carried by the truck or carriage and supported by the platform 23 and adapted to receive its current by means of the circuit wires, hereinafter more particularly described. The shaft 26 of the motor B is geared to one of the wheels 25, as shown in Fig. 3, said wheel becoming the traction wheel by which the truck or carriage is propelled along the wires 22. As illustrated, a pinion 27 is fast on the shaft 26 of the motor B, and meshes with a large spur gear wheel 28 which in turn drives a smaller gear wheel 29 on a counter shaft 30 having fast thereon a pinion 31 which meshes with a spur wheel 32 having a fixed connection with the traction wheel 25, so that when the motor B revolves, rotary motion is imparted to the traction wheel 25, causing the truck or carriage to move lengthwise of its supporting track 22.

Suspended freely below the truck or carriage, hereinabove described, is a current collector, embodying a truck frame 33 provided with grooved contact wheels 34 which move in electrical contact with current wires 35 and 36. At one end of the collector, each wheel 34 is journaled in a metal carrier 37, as illustrated in Figs. 4 and 5, said carrier being insulated from the body or frame of the collector by the insulating insert 38, as shown in Fig. 5. These two wheel carriers are provided with binding posts 39 and 40.

The weight of the cable 7 is borne by a cable hanger 49 extending below the bottom of the truck or carriage, as shown in Fig. 1. Connected to the central portion of said hanger is a connector 50 of any usual or preferred construction, embodying separable plug and socket members, by means of which the cable 7 is divided into sections at such point, for enabling the overhead truck or carriage to be disconnected from the boat, when required. By the means described, the weight of the cable is carried by the truck, and the latter is in turn supported by the track 22, thereby removing any appreciable weight from the current collector 23 which is freely suspended below the trolley truck or carriage by means of flexible chains 51.

Referring now to the diagrammatic view of Fig. 6 illustrating the circuits, the winding drum 5' has an insulating sleeve 10' encircling one end of its shaft adapted to have embedded therein conducting rings 10 and 11. Bearing upon the conducting ring 10 is a brush 12 forming a terminal of the conductor 14, the remaining terminal of said conductor being connected to the pivot of the switch levers A' and B'. Bearing upon the remaining conducting ring is a brush 13 forming a terminal for circuit wires 16 and 17, the terminals of which are provided with contacts a and b for coöperation with the switch levers A' and B'. Connected in series with the conductor 16 is a motor A which is positioned in the boat for propelling the same. 35 and 36 represent the trolley wires upon which the trolley wheels 34 of the current collector travels. Having an electrical connection with the wheels 34 are binding posts 39 and 40 which are connected with similar binding posts 43 and 44 carried by the platform, by conductors 41 and 42. Running from the binding post 43 is a conductor 46 connected to the metal drum 5'. A conductor 47 has one terminal connected to the binding post 44 and its remaining terminal connected to the conducting ring 10. A third conductor 48 has one of its terminals connected to the binding post 43 and its remaining terminal connected to the conducting ring 11, the motor B being in series therewith. The intermediate portions of the wires 46, 47 and 48 are formed into a cable 7, a strand of the cable 7 which is wire 46, being connected to the binding post 43. It will be seen that having a connection as shown, that one motor can operate independent of the other, or the two can work simultaneously by manipulating the levers A' and B' so as to engage the contacts A and B. The advantage of this is that the motor carried by the truck or carriage can propel itself, and tow the boat, or the motor in the boat can be energized to propel the boat independent of the carriage. Thus, the boat can be propelled in a circular path without in any way interfering with the travel of the carriage.

From the foregoing description, it will now be understood that the boat has its own motor, and the overhead truck or carriage has its own or individual motor, and that either of said motors may be energized independently of the other, or if desired, both motors may be simultaneously energized. Where both motors are energized, it is unnecessary either for the boat to tow the overhead carriage, or vice versa. It will also be seen that the weight of the cable 7, which is necessarily somewhat heavy, is borne by the hanger 49 extending downwardly from and supported by the main truck or carriage, which is in turn supported by the stout track wires 22. Therefore, the only burden placed upon the more delicate current wires is that of the current collector which is freely swung below the main truck, so that no portion of the weight of the main truck comes on said wires 35.

What is claimed is:

1. The combination with a pair of electric trolley wires and a pair of superposed supporting cables, of a trolley carriage comprising an upper platform traveling on the supporting cables, a lower platform having a flexible connection with said upper platform and traveling on the trolley wires, a motor for propelling the upper platform, and circuit wires running from the lower platform to the upper platform for supplying current to said motor.

2. The combination with a pair of electric trolley wires and a pair of superposed supporting cables, of a trolley carriage comprising an upper platform, a lower platform having a flexible connection with said upper platform and traveling on the trolley wires, a motor for propelling the upper platform, circuit wires running from the lower platform to the upper platform for supplying current to said motor, and a U-shaped cable supporting frame depending from the upper platform.

3. The combination with a pair of electric wires and a pair of superposed supporting cables, of a trolley carriage comprising an upper rectangular platform having wheels at its corners for traveling on the supporting cables, a lower rectangular platform having a flexible connection with said upper platform and traveling on the trolley wires, a motor for propelling the lower platform, a gear connection between the said motor and one of the wheels of said platform, and circuit wires running from the lower platform to the upper platform for supplying current to said motor.

4. The combination with a pair of electric wires and a pair of superposed supporting cables, of a trolley carriage comprising an upper rectangular platform having wheels at its corners for traveling on the supporting cables, a lower rectangular platform having a flexible connection with said upper platform and traveling on the trolley wires, wheel carriers positioned at the corners of said rectangular lower platform, certain of which are insulated from the platform, wheels supported in the said carriers, binding posts carried by the insulated carriers, a U-shaped cable supporting frame depending from the upper platform, a motor for propelling the upper platform, a gear connection between said motor and one of the wheels of said upper platform, and circuit wires connecting the binding posts on the lower platform with the said motor.

In testimony whereof I affix my signature in presence of two witnesses.

JAMES LAMB.

Witnesses:
JOHN D. DUFFIELD,
FRED VANSICKLE.

Copies of this patent may be obtained for five cents each, by addressing the "Commissioner of Patents, Washington, D. C."